United States Patent [19]
Moffatt et al.

[11] 3,878,194

[45] Apr. 15, 1975

[54] NOVEL PHOSPHORYLATED PHOSPHONIUM YLIDS

[75] Inventors: John G. Moffatt; Gordon H. Jones, both of Los Altos, Calif.

[73] Assignee: Syntex (U.S.A) Inc., Palo Alto, Calif.

[22] Filed: Oct. 15, 1971

[21] Appl. No.: 189,562

Related U.S. Application Data

[60] Division of Ser. No. 709,234, Feb. 29, 1968, Pat. No. 3,662,031, which is a continuation-in-part of Ser. No. 654,056, June 18, 1967, abandoned.

[52] U.S. Cl................ 260/211.5 R; 260/954; 71/86; 71/87; 260/956; 195/28 N; 252/46.6; 260/968; 260/247.7 D; 260/252; 424/200; 260/254; 260/256.4 E; 424/180; 260/293.4 B; 260/293.4 R; 424/203; 260/502.4 R; 260/551 P; 424/219; 260/927 R; 260/932

[51] Int. Cl... C07d 51/50; C07d 105/04; C07f 9/54

[58] Field of Search............................ 260/211.5 R

[56] References Cited
UNITED STATES PATENTS
3,583,974   6/1971   Jones et al.................. 260/211.5 R

*Primary Examiner*—Johnnie R. Brown
*Attorney, Agent, or Firm*—Lawrence S. Squires; William B. Walker

[57] ABSTRACT

Novel phosphorylated phosphonium ylids are prepared by reacting a monosubstituted phosphonium ylid with an appropriately disubstituted phosphoryl halide or thiophosphoryl halide. The novel ylids are useful as intermediates in the preparation of phosphonic acid or thiophosphonic acid derivatives therefrom and as intermediates for the preparation of insecticides, herbicides, oil additives and 5',6'-dideoxyhexofuranosylnucleoside 6'-phosphonic acid.

8 Claims, No Drawings

NOVEL PHOSPHORYLATED PHOSPHONIUM YLIDS

This is a division of application Ser. No. 709,234 filed Feb. 29, 1968, now U.S. Pat. No. 3,662,031 which is a continuation-in-part of application Ser. No. 654,056, filed July 18, 1967, and now abandoned.

This invention relates to a new class of phosphorylated phosphonium ylids and to a process for the preparation of 5',6'-dideoxyhexofuranosylnucleoside 6'-phosphonic acids therewith. More particularly, the invention relates to a new class of phosphorylated phosphonium ylids having the following formula:

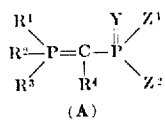

(A)

wherein
each of $R^1$, $R^2$ and $R^3$ is lower alkyl, aryl or substituted aryl;
$R^1$, $R^2$ and $R^3$ together are tri-N-piperidyl, tri-N-morpholinyl or tricyclohexyl;
$R^4$ is hydrogen, lower alkyl, cyclohexyl, aryl, or substituted aryl;
Y is oxygen or sulfur;
each of $Z^1$ and $Z^2$ is the group $OR^5$, $SR^6$,

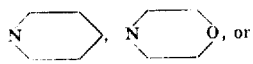

or $NR^7R^8$ in which each of $R^5$ and $R^6$ is lower alkyl, lower alkenyl, aryl or substituted aryl, and each of $R^7$ and $R^8$ is lower alkyl, of aryl; and
$Z^1$ and $Z^2$ together are the group

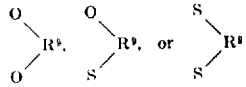

in which $R^9$ is alkylene or arylene.

The term "lower alkyl" means a straight or branched chain hydrocarbon group containing from 1 to 6 carbon atoms, inclusive, such as methyl, ethyl, n-propyl, i-butyl, t-butyl, and the like. The term "lower alkenyl" means an alkyl group containing one carbon-carbon double bond such as allyl and the like. The term "aryl" means a hydrocarbon group consisting of one or more aromatic rings and containing from 6 to 12 carbon atoms, inclusive, such as phenyl, benzyl, o-tolyl, m-tolyl, p-tolyl, 3,5-xylyl, pentamethylphenyl, naphthyl, and the like. The term "substituted aryl" means an aryl group having one or more halo, nitro, alkoxy, or dialkylamino substituents in the aromatic ring such as p-chlorobenzyl, p-bromobenzyl, 2,4,6-trichlorophenyl, p-nitrophenyl, p-nitrobenzyl, p-anisyl, p-methoxybenzyl, p-dimethylaminophenyl, and the like. The term "lower alkylene" means the group $-(CH_2)_n-$ in which n has a value of from 2 to 4, inclusive, such as ethylene, trimethylene and tetramethylene, said group can be further substituted with one or more alkyl or aryl groups such as in 2,2-dimethyltrimethylene, 1,2-diphenylethylene and the like. The term "arylene" means an aryl group having two sites of attachment such as o-phenylene and the like.

A primary object of the present invention is to provide a new class of phosphorylated phosphonium ylids which can be reacted with a wide variety of aldehydes and ketones, thereby providing unsaturated phosphonate or thiophosphonate derivatives thereof. Another object of the invention is to provide a process for reacting the novel phosphorylated phosphonium ylid with a nucleoside 5'-aldehyde to form the corresponding 5',6'-dideoxyhex-5'-enofuranosylnucleoside 6'-phosphonate. The latter unsaturated nucleoside is catalytically hydrogenated or chemically reduced and then converted to a corresponding 5',6'-dideoxyhexofuranosylnucleoside 6'-phosphonic acid by hydrolysis, hydrogenolysis, anionic dealkylation, or enzymatic action or combinations thereof.

The novel phosphorylated phosphonium ylids of Formula (A) are prepared according to the following reaction:

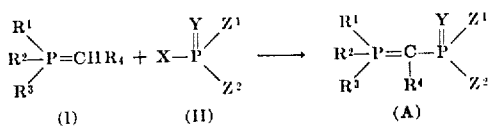

wherein X is chloro or bromo; and all other substituents are as defined hereinabove.

In the practice of the above sequence, a monosubstituted phosphonium ylid (I) is condensed under substantially anhydrous conditions with an appropriately disubstituted phosphoryl halide or thiophosphoryl halide (II) in a non-reactive organic solvent such as tetrahydrofuran, dioxane, dimethylformamide, dimethyl sulfoxide, benzene, diethyl ether, hexane, and the like, and mixtures thereof, at a temperature of about 0°C to the reflux temperature of the solvent, for a period of about ½ to about 12 hours. Preferably, the condensation is performed in diethyl ether, hexane, tetrahydrofuran, benzene, or mixtures thereof, with an appropriately disubstituted phosphoryl chloride or thiophosphoryl chloride (II), i.e. wherein X is chloro. Furthermore, reactions of the monosubstituted phosphonium ylid (I), wherein $R^4$ is hydrogen, alkyl or cyclohexyl, are preferably performed at room temperature for a period of about 15 minutes to about 1 hour; and reactions of the monosubstituted phosphonium ylid (I), wherein $R^4$ is aryl or substituted aryl are preferably performed at the reflux temperature of the solvent for a period of about 2 hours or longer.

Although the molar proportion of the monosubstituted phosphonium ylid (I) to the disubstituted phosphoryl halide or thiophosphoryl halide (II) is not critical, a preferred embodiment of two moles of the monosubstituted phosphonium ylid per mole of the disubstituted phosphoryl halide or thiophosphoryl halide (II) is convenient.

In the practice of the above sequence, the reaction is advantageously performed in the presence of an inert atmosphere such as a nitrogen atmosphere, an argon atmosphere, and the like. In addition, the monosubstituted phosphonium ylid (I) is generated in situ by conventional techniques known to those skilled in the art.

Included among the monosubstituted phosphonium ylids (I) which can be condensed with the disubstituted phosphoryl halide or thiophosphoryl halide (II) are methylenetrialkyl(including cycloalkyl)phosphoranes such as methylenetri-(n-butyl)phosphorane, methylenetrimethylphosphorane, methylenetricyclohexylphosphorane, and the like; methylenealkylarylphosphoranes such as methyleneethyldiphenylphosphorane, methylenemethyldiphenylphosphorane, methylenediphenyl-t-butylphosphorane, and the like; methylenetriarylphosphoranes such as methylenetriphenylphosphorane, methylenetri-p-tolylphosphorane, methylenetri-p-anisylphosphorane, and the like; alkylidenetrialkylphosphoranes such as ethylidene-(n-butyl)phosphorane, and the like, alkylidenealkylarylphosphoranes such as ethylidenemethyldiphenylphosphorane, and the like; alkylidenetriarylphosphoranes such as ethylidenetriphenylphosphorane, propylidenetriphenylphosphorane, butylidenetriphenylphosphorane, pentylidenetriphenylphosphorane, cyclohexylmethylenetriphenylphosphorane, β-phenylethylidenetriphenylphosphorane, 3-methylbutylidenetriphenylphosphorane, and the like; arylmethylenetrialkylphosphoranes such as benzylidenetrimethylphosphorane, benzylidenetricyclohexylphosphorane, and the like; arylmethylenetriarylphosphoranes such as benzylidenetriphenylphosphorane, p-nitrobenzylidenetriphenylphosphorane, p-methoxybenzylidenetriphenylphosphorane, benzylidenediphenyl-p-dimethylaminophenylphosphorane, and the like; and methylenetri-N-morpholinylphosphorane, methylenetri-N-piperidylphosphorane, and the like.

Additionally, other monosubstituted phosphonium ylids (I) are prepared according to conventional procedures as described by S. Trippett, "Advances in Organic Chemistry", Interscience Publishing Co., New York (1960), Vol. 1, pages 83–102; S. Trippett, Quarterly Review, Vol. 16–17, pages 400–440 (1962–1963); A.W. Johnson, "Ylid Chemistry", Academic Press, New York (1966); and A. Maercker, "Organic Reactions", Vol. 14, John Wiley & Sons, Inc., New York (1965).

Included among the disubstituted phosphoryl halides or thiophosphoryl halides (II) which can be used to prepare the novel phosphorylated phosphonium ylids (A) are disubstituted phosphorochloridates such as dimethyl phosphorochloridate, di-ethyl phosphorochloridate, di-allyl phosphorochloridate, di-iso-butyl phosphorochloridate, diphenyl phosphorochloridate, di-o-tolyl phosphorochloridate, di-m-tolyl phosphorochloridate, di-p-tolyl phosphorochloridate, o-phenylene phosphorochloridate, trimethylene phosphorochloridate, di-3,5-xylyl phosphorochloridate, di-(p-nitrophenyl) phosphorochloridate, 1,2-diphenylethylene phosphorochloridate, 2,2-dimethyltrimethylene phosphorochloridate, ethyl p-nitrophenyl phosphorochloridate, dibenzyl phosphorochloridate, di-(p-nitrobenzyl) phosphorochloridate, di-(pentamethylphenyl) phosphorochloridate, di-(p-bromobenzyl) phosphorochloridate, and the like; disubstituted phosphorobromidates such as dimethyl phosphorobromidate, diphenyl phosphorobromidate, methyl phenyl phosphorobromidate, o-phenylene phosphorobromidate, and the like; disubstituted chloridothioates such as O,O-diethyl phosphorochloridothioate, O,O-dimethyl phosphorochloridothioate, O,O-diphenyl phosphorochloridothioate, O,O-di(p-chlorobenzyl) phosphorochloridothioate, O,S-diethyl phosphorochloridothioate, O-ethyl-O-p-nitrophenyl phosphorochloridothioate, O-methyl-O-2,4,5-trichlorophenyl phosphorochloridothioate, and the like; disubstituted chloridodithioates such as S,S-diethyl phosphorochloridodithioate, S,S-dibutyl phosphorochloridodithioate, and the like; disubstituted chloridotrithioates such as diethyl phosphorochloridotrithioate, and the like; disubstituted phosphorobromidothioates such as O,O-diethyl phosphorobromidothioate, O,O-diphenyl phosphorobromidothioate and the like, disubstituted phosphorodiamidic chlorides such as tetraethylphosphorodiamidic chloride, phosphorodimorpholidic chloride, N,N'-dimethylphosphorodianalidic chloride, tetramethyl phosphorodiamidic chloride, and the like; disubstituted phosphorodiamidic bromides such as phosphorodimorpholidic bromide and the like; mixed disubstituted phosphoramidochloridates such as O-phenyl N,N-diethylphosphoramidochloridate, O-ethyl N,N-diethylphosphoramidochloridate, O-isopropyl N,N-dimethylphosphoramidochloridate, and the like; mixed disubstituted phosphoramidochloridothioates such as S-butyl N,N-diethylphosphoramidochloridothioate, O-ethyl N,N-diethylphosphoramidochloridothioate, O-[2,4,5-trichlorophenyl] N,N-dimethylphosphoramidochloridothioate, and the like.

Additionally, other disubstituted phosphoryl halides or thiophosphoryl halides (II) are obtained by conventional techniques as described by G.N. Kosolapoff, "Organophosphorus Compounds", John Wiley & Sons, Inc., New York (1950), Chapters 9 and 10. For example, the disubstituted phosphoryl halides or thiophosphoryl halides, i.e. when $Z^1$ and $Z^2$ together are the group $(OR^5)_2$ or $(SR^6)_2$ are prepared by adding 2 moles of a hydroxy or mercapto containing compound to 1 mole of phosphoryl chloride, phosphoryl bromide, thiophosphoryl chloride, or thiophosphoryl bromide in an essentially anhydrous non-reactive solvent such as chloroform, benzene, ether, tetrahydrofuran, dioxane, or mixtures thereof, and the like, at a temperature of from about room temperature to the reflux temperature of the solvent for a period of about 1 to 12 hours, as shown by the following equations and as described on pages 211–213 of the latter reference:

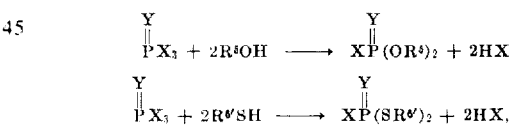

$R^6$ being lower alkyl and all other substituents being as defined hereinabove. When the reaction is performed at the lower temperature, i.e. about room temperature, it is convenient to use the moles of teritary base such as 2,4,6-collidine, 2,6-lutidine, N,N-dimethylaniline and the like to remove the liberated acid HX. Included among the hydroxy containing compounds which can be reacted with the phosphorus halide

are alcohols such as methanol, ethanol, n-propanol, iso-butanol, n-amyl alcohol, and the like; phenols such as phenol, o-cresol, m-cresol, p-cresol, p-cresol, 3,5-xylenol, pentamethyl phenol, 4-chlorophenol, and the like; and mercaptans such as methanethiol, ethanethiol, n-propanethiol, and the like.

Other disubstituted phosphoryl halides and thiophosphoryl halides, i.e. wherein $Z^1$ and $Z^2$ together are $(SR^6)_2$ in which $R^6$ is aryl or substituted aryl are prepared by first adding 3 moles of the sodium salt of a thiophenol to 1 mole of phosphoryl chloride, phosphoryl bromide, thiophosphoryl chloride, or thiophosphoryl bromide, to obtain a trithioester and second treating the trithioester with one mole of acetyl chloride or acetyl bromide as shown in the following equations and as described on page 218 of the latter reference.

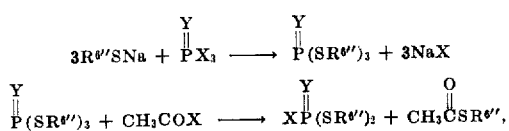

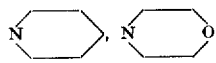

$R^{6''}$ being aryl or substituted aryl; and all other substituents are as defined hereinabove. Included among the thiophenols which can be reacted in the above manner, are thiophenol, thio-o-cresol, thio-p-cresol, and the like.

The disubstituted phosphorodiamidic halides, i.e. wherein each of $Z^1$ and $Z^2$ is the group

or $NR^7R^8$, are prepared by adding four moles of a secondary amine to one mole of either phosphoryl chloride, phosphoryl bromide, thiophosphoryl chloride, or thiophosphoryl bromide, in an essentially anhydrous non-reactive organic solvent such as chloroform, benzene, ether, tetrahydrofuran, dioxane, or mixtures thereof, and the like, at a temperature of from about room temperature to the reflux temperature of the solvent, for a period of about 1 to 12 hours, as shown by the following equation and as described on pages 279 and 281–282 of the latter reference:

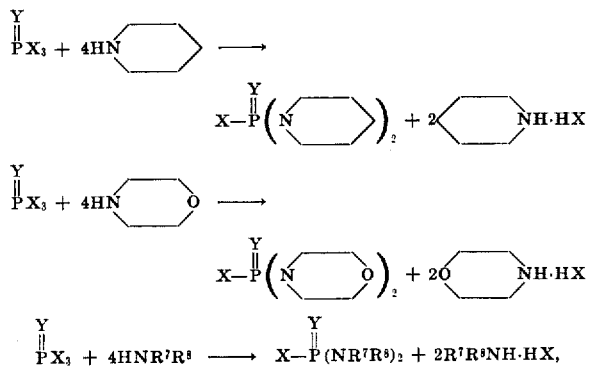

all substituents being as defined hereinabove. Included among the secondary amines which can be reacted with the phosphorus halide

are piperidine, morpholine; dialkyl amines such as dimethylamine, diethylamine, di-n-propylamine, and the like; diaryl amines such as diphenylamine and the like; and mixed alkyl aryl amines such as N-methylaniline and the like.

The mixed disubstituted phosphoryl halides or thiophosphoryl halides (II), i.e. wherein each of $Z^1$ and $Z^2$ are different, are prepared by varying the molar proportions of reactants and proceeding in a two-step reaction sequence, as shown by the following equations:

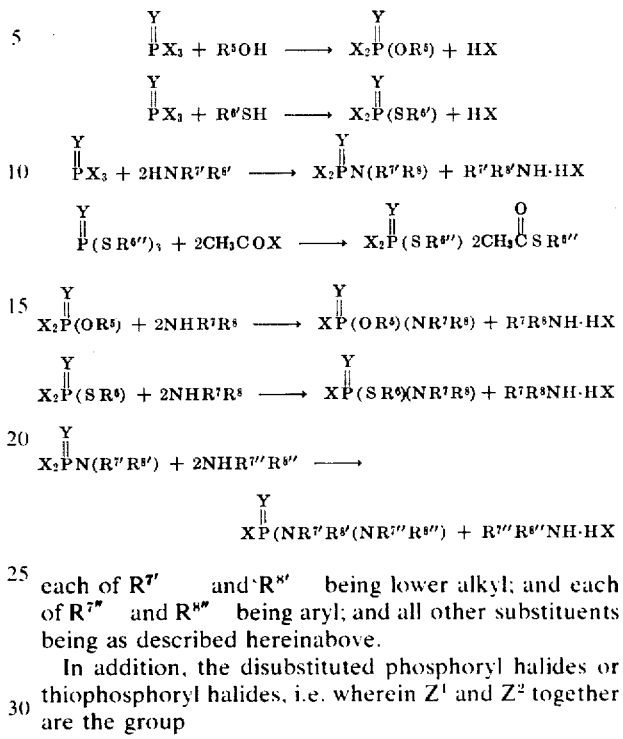

each of $R^{7'}$ and $R^{8'}$ being lower alkyl; and each of $R^{7''}$ and $R^{8''}$ being aryl; and all other substituents being as described hereinabove.

In addition, the disubstituted phosphoryl halides or thiophosphoryl halides, i.e. wherein $Z^1$ and $Z^2$ together are the group

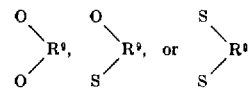

are prepared by adding one mole of a dihydroxy containing compound, a dimercapto containing compound or a monohydroxy monomercapto compound to one mole of phosphoryl chloride, phosphoryl bromide, thiophosphoryl chloride, or thiophosphoryl bromide under essentially the same anhydrous conditions as described above, and as shown by the following equations:

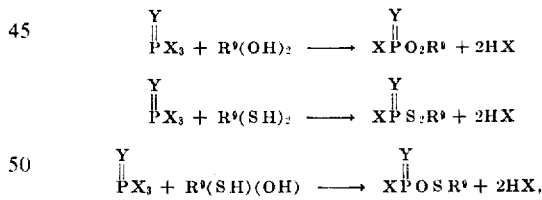

all substituents being as defined above. When the reaction is performed at the lower temperature, i.e. at about room temperature, it is convenient to use two moles of a tertiary amine such as 2,4,6-collidine, 2,6-lutidine, N,N-dimethylaniline, and the like, to remove the liberated acid HX. Included among the compounds of the formulas $R^9(OH)_2$, $R^9(SH)_2$ and $R^9(SH)(OH)$ which can be reacted with the phosphorus halide

are dihydroxy compounds such as ethylene glycol, trimethylene glycol, tetramethylene glycol, 2,2-dimethyltrimethylene glycol, 1,2-diphenylethylene glycol, catechol, and the like; dimercapto compounds such as 1,2-ethanedithiol, 1,3-propanedithiol, 1,4-butanedithiol, 1,2-benzenedithiol, and the like; and monohydroxy monomercapto compounds such as 2-mercaptoethanol, 3-mercaptopropanol, monothiocatechol, and the like.

As a first alternative, some of the novel phosphorylated phosphorus ylids of the present invention are prepared according to the following reaction sequence:

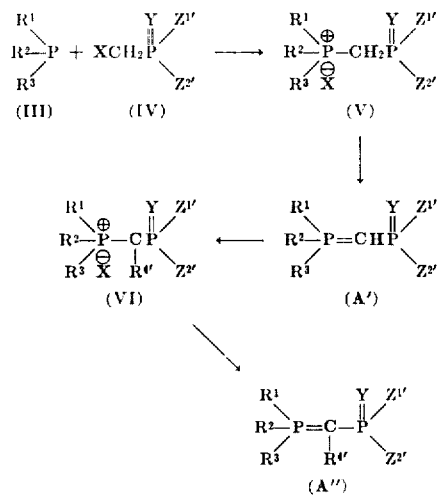

wherein R'' is lower alkyl or cyclohexyl; each of Z'' and Z²' is the group OR³'

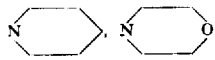

or NR⁷R⁸ in which R⁵' is aryl or substituted aryl; and all other substituents being as defined hereinabove.

In the practice of this alternative method, a trisubstituted phosphine (III) is allowed to react under substantially anhydrous conditions with an appropriately disubstituted halomethylphosphonic acid or halomethylphosphonothioic acid (IV) in a non-reactive organic solvent such as tetrahydrofuran, dioxane, benzene, dimethylformamide, and the like, or mixtures thereof, at room temperature to the reflux temperature of the solvent for a period of about 15 minutes to 24 hours, to afford a phosphorylated phosphonium halide salt (V). The latter salt (V) is converted to a corresponding phosphorylated phosphonium ylid (A') by treatment with an aqueous solution of a base, said solution optionally containing an organic solvent such as a lower monohydric alcohol such as methanol, ethanol and the like; a cyclic water-miscible ether such as dioxane, tetrahydrofuran and the like. Bases particularly useful for this purpose are potassium hydroxide, sodium hydroxide, sodium ethoxide, sodium carbonate, pyridine, and the like. The conversion is effected at room temperature for a period of 5 minutes to 24 hours, a period of 15 minutes being preferred.

The thus-obtained novel ylid (A') is alkylated, if desired, by treatment with a halide of the formula R⁴'X in a non-reactive organic solvent such as ethyl acetate, benzene, dioxane, dimethylformamide and the like, at an elevated temperature, e.g. the reflux temperature of the solvent for a period of about 15 minutes to 3 hours to afford a corresponding alkylated phosphorylated phosphonium salt (VI). The latter salt (VI) is converted to a corresponding ylid (A'') by treatment with a base as described hereinabove for the unalkylated salt (V).

The trisubstituted phosphines (III) which can be used to prepare some of the novel phosphorylated phosphonium ylids (A' and A'') are described in the literature cited above.

The disubstituted halomethylphosphonic acids or halomethylphosphonothioic acids (IV) are prepared by adding a phenol, a secondary amine, or combinations thereof, in a stepwise manner, to chloromethylphosphonic acid dichloride, bromomethylphosphonic acid dichloride, chloromethylphosphonothioic dichloride, or bromomethylphosphonothioic dichloride, bromomethylphosphonic acid dibromide, bromomethylphosphonothioic acid dibromide, and the like, either alone or in the presence of a non-reactive organic solvent such as tetrahydrofuran, dioxane, benzene, or the like, or mixtures thereof, at reflux for a period of about 4 to 12 hours. The molar proportions of materials are varied, and the reaction is to be performed in a step-wise manner depending on the particular material (IV) being prepared, by procedures such as described hereinabove the preparation of the mixed disubstituted phosphoryl halides or thiophosphoryl halides (II).

As a second alternative, some of the novel phosphorylate phosphorus ylids of the present invention, i.e. wherein Y is oxygen, are prepared according to the following reaction:

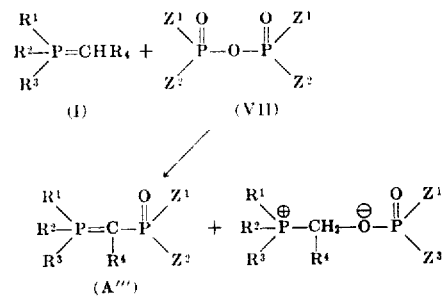

wherein all substituents are as defined hereinabove.

In the practice of the second alternative method, the monosubstituted phosphonium ylid (I) is allowed to react under substantially anhydrous conditions with an appropriately tetrasubstituted pyrophosphate (VII) in a non-reactive organic solvent such as tetrahydrofuran, ether, benzene, n-hexane, and the like, or mixtures thereof, at room temperature to the reflux temperature of the solvent for a period of 15 minutes to about 3 hours.

The tetrasubstituted pyrophosphates (VII) are prepared by first hydrolyzing the disubstituted phosphoryl halide or thiophosphoryl halide (II) in an aqueous media at reflux for a period of about one-half to two hours to afford an intermediary disubstituted phosphoric acid, and second condensing said disubstituted phosphoric acid in the presence of a carbodiimide such as dicyclohexylcarbodiimide, di-p-tolylcarbodiimide, and the like, in an essentially anhydrous non-reactive organic solvent such as benzene, ether, dioxane, and the like, such as described by H. G. Khorana and A. R. Todd, *J. Chem. Soc.*, 2257 (1956).

As a third alternative, some of the novel phosphorylated phosphonium ylids of the present invention, i.e. those of Formula (A) in which $R^4$ is lower alkyl or cyclohexyl, are prepared according to the following reaction sequence:

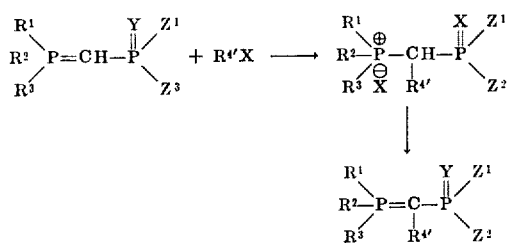

all substituents being as defined hereinabove.

In the practice of the third alternative method, the novel unalkylated phosphorylated phosphonium ylid [(A), wherein $R^4$ is hydrogen], is converted to the corresponding novel alkylated phosphorylated phosphonium ylid [(A), wherein $R^4$ is lower alkyl or cyclohexyl], by treatment with a halide of the formula $R^{4\prime\prime}X$ followed by basic treatment with an aqueous solution of a base as described hereinabove in the first alternative method.

The phosphorylated phosphonium ylids (A) are valuable intermediates which can be reacted with a wide variety of aldehydes and ketones, thereby providing unsaturated phosphonate and thiophosphonate derivatives thereof. Thus, the present invention provides a valuable synthetic route for the preparation of phosphonic acids and thiophosphonic acids therefrom, as shown by the following reaction sequence:

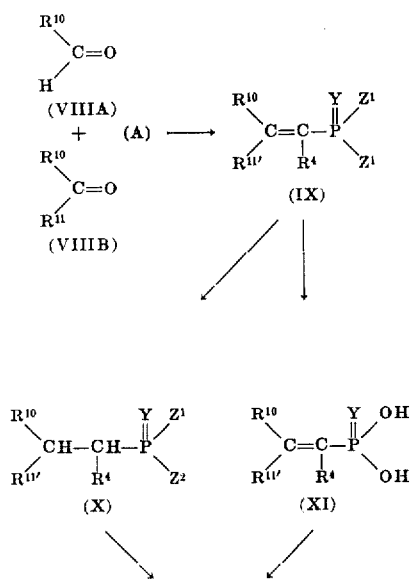

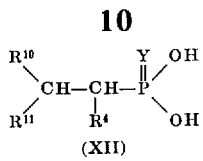

wherein each of

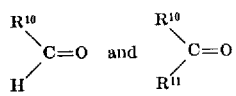

is an aldehyde and ketone, respectively; $R^{11\prime}$ being hydrogen or $R^{11}$; and all other substituents being as defined herein.

In the practice of the latter reaction sequence, the phosphorylated phosphonium ylid (A) is allowed to react with a carbonyl compound of Formulas (VIIIA) and (VIIIB), respectively, either alone or in an inert organic solvent such as tetrahydrofuran, dioxane, dimethylformamide, dimethyl sulfoxide, methanol, ethanol, acetonitrile, or mixtures thereof, and the like, at a temperature of 25°C to the reflux temperature of the solvent but preferably at about 25°C for a period of from 1 to 48 hours, to form a corresponding α,β-unsaturated phosphonate or thiophosphonate derivative (IX).

Any aldehyde, i.e.

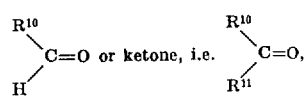

can be reacted with the phosphorylated phosphonium ylids of the present invention to form a corresponding α,β-unsaturated phosphonate or thiophosphonate derivative thereof, i.e.

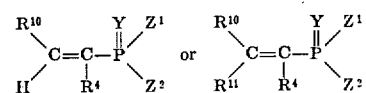

For example, the carbonyl compounds of Formulas (VIIIA) and (VIIIB) may be any aldehyde or ketone of the aliphatic, alicyclic, aromatic, or heterocyclic series.

Included among the aliphatic, alicyclic and aromatic groups which $R^{10}$ and $R^{11}$ can represent are alkyl (including saturated and unsaturated, straight and branched chain alkyl and cycloalkyl) and aryl (including alkaryl and aralkyl) groups, such as methyl, ethyl, propyl, isopropyl, n-butyl, sec-butyl, amyl, hexyl, heptyl, octyl, allyl, methallyl, cyclobutyl, cyclopentyl, cyclohexyl, methylcyclohexyl, cycloheptyl, cyclohexenyl, phenyl, tolyl, xylyl, benzyl, and the like, as well as fused ring structures, such as indanyl, indenyl, naphthyl, acenaphthyl, phenanthryl, and cyclopentanopolyhydrophenanthryl rings, and the like, all of which can either be unsubstituted or substituted with one or more noninterfering substituents, e.g., hydroxyl groups; hydroxyl derivatives, such as alkoxy, e.g. methoxy and acyloxy, e.g. acetoxy groups; nitro groups; amino groups; alkylamino groups, such as methylamino, dimethylamino and diethylamino groups; halogen, e.g. fluorine or chlorine; carbonyl derivatives; such as enol ether, acetal and ketal groups, and the like.

The thus-obtained α,β-unsaturated phosphonate (IX), i.e. wherein Y is oxygen, is catalytically hydrogenated at room temperature by conventional technique such as in the presence of a palladium on an inert support catalyst such as palladium-on-barium sulfate, palladium-on-calcium carbonate and the like, in a lower alcoholic solvent such as methanol, ethanol and the like, to form a corresponding saturated phosphonate (X).

Alternatively, the α,β-unsaturated phosphonate (IX) is reduced by treatment with diimide at room temperature in an inert non-reactive solvent such as methanol, ethanol, ethyl acetate and the like, or mixtures thereof, for a period of about one to about 24 hours to afford the corresponding saturated phosphonate (X).

The thus-obtained α,β-unsaturated thiophosphonates (IX), i.e. wherein Y is sulfur, which adversely affects the efficiency of the palladium catalyst, as well as the α,β-unsaturated phosphonate (IX) having one or more groups such as nitro, allyl and the like, which would be simultaneously reduced, are reduced by the diimide method as described above to afford the corresponding saturated thiophosphonate and phosphonates (X).

Each of the $Z^1$ and $Z^2$ groups in the thus-obtained α,β-saturated phosphonate or thiophosphonate (X) is removed by hydrolysis, hydrogenolysis, anionic dealkylation, enzymatic action, or combinations thereof, under a variety of different conditions to afford the α,β-saturated phosphonic acid or phosphonothioic acid (XII). The variety of conditions is dependent upon the nature of the $Z^1$ and $Z^2$ groups so that the removal of the first group and then a second group can be effected in a step-wise manner or the removal of both groups can be effected in a one-step procedure as will be discussed in more detail below.

Alternatively, the α,β-unsaturated phosphonate or thiophosphonate (IX) is converted to the corresponding α,β-unsaturated phosphonic acid (XI) by hydrolysis, hydrogenolysis, anionic dealkylation, enzymatic action, or combinations thereof, and the latter αβ-unsaturated phosphonic acid or thiophosphonic acid (XI) is converted to saturated phosphonic acid or thiophosphonic acid (XII) as described hereinabove.

Furthermore, the phosphorylated phosphonium ylids having the formula:

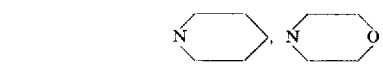

wherein
each of $Z^{1'''}$ and $Z^{2'''}$ is the group $OR^5$, $SR^6$,

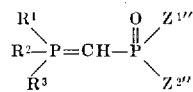

or $NR^{7'}R^{8'}$ in which
each of $R^5$ and $R^6$ is lower alkyl, lower alkenyl, aryl or substituted aryl, and
each of $R^{7'}$ and $R^{8'}$ is lower alkyl;
$Z^{1'''}$ and $Z^{2'''}$ together are the group

in which $R^{9'}$ is arylene; and
all other substituents being as defined hereinabove, are valuable intermediates in the preparation of nucleoside 6'-phosphonic acids. For example, when $R^{10}$ in the general formula

given above for an aldehyde, represents a particular class of substituted tetrahydrofurfuryl groups, i.e. those having the structures:

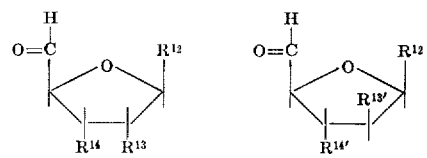

wherein $R^{12}$ is a substituted or unsubstituted pyrimidine or purine base, e.g. uracil-l-yl, cytosin-l-yl, 4-chloro-1,2-dihydropyrimidin-2-on-l-yl, 5bromouracil-l-yl, 5-bromocytosin-l-yl, 5-chlorouracil-l-yl, 5-chlorocytosin-l-yl, 5-iodouracil-l-yl, 5-iodocytosin-l-yl, 5-fluorouracil-l-yl, 5-fluorocytosin-l-yl, thymin-l-yl, 5-methylcytosin-l-yl, 5-trifluoromethyluracil-l-yl, 5-trifluoromethylcytosin-l-yl, 5-aminouracil-l-yl, 5-aminocytosin-l-yl, 5-methylaminouracil-l-yl, 5-methylaminocytosin-l-yl, 5-hydroxyuracil-l-yl, 6-azauracil-l-yl, 6-azacytosin-l-yl, 4-chloro-6-aza-1,2-dihydropyrimidin-2-on-l-yl, 6-azathymin-l-yl, hypoxanthin-9-yl, adenin-9-yl, 6-dimethylaminopurin-9-yl, 2-chloroadenin-9-yl, 6-chloropurin-9-yl, 6-mercaptopurin-9-yl, guanin-9-yl, xanthin-9-yl, 2,6-dichloropurin-9-yl, 2,6-bis(methylamino)purin-9-yl, 8-azaadenin-9-yl, 8-azaguanin-9-yl, 7-deazaadenin-9-yl, and the like;

each of $R^{13}$ and $R^{13'}$ is hydrogen, hydroxy, alkoxy or acyloxy;

each of $R^{14}$ and $R^{14'}$ is hydrogen, hydroxy, alkoxy or acyloxy; and $R^{13}$ and $R^{14}$ together are acetal or ketal group, e.g. isopropylidenedioxy, p-anisylidenedioxy, and the like, the starting material is a nucleoside 5'-aldehyde and will be converted by reaction with the latter ylid using the process of the present invention to the corresponding intermediary 5', 6'-dideoxyhex-5'-enofuranosylnucleoside 6'-phosphonate

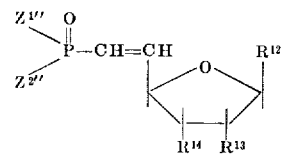

and arabinohex-5'-enfuranosyl nucleoside 6'-phosphonate, respectively

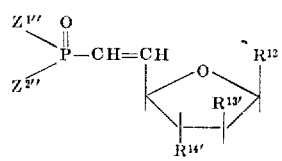

wherein all substituents are as defined hereinabove.

The intermediary α,β-unsaturated phosphonates are converted by catalytic hydrogenation or diimide reduction as described hereinabove to afford a corresponding saturated phosphonate, i.e., nucleoside 6'-phosphonates having the formulas:

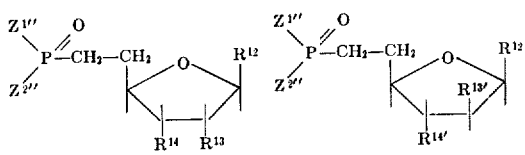

wherein all substituents are as defined hereinabove.

As exemplified by the following procedures, both of the $Z^{1\prime\prime\prime}$ and $Z^{2\prime\prime\prime}$ groups in the latter compound can be removed by hydrolysis, hydrogenolysis, anionic dealkylation, enzymatic action or combinations thereof, to afford a corresponding nucleoside 6'-phosphonic acid, i.e.

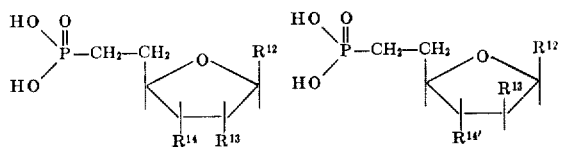

wherein all substituents are as defined hereinabove. For example, where each of $Z^{1\prime\prime\prime}$ and $Z^{2\prime\prime\prime}$ represents the group $OR^5$ in which $R^5$ is lower alkyl, the alkyl groups are removed by heating with an iodide salt such as sodium iodide, in an aprotic dipolar solvent, such as dimethylformamide, at a temperature of about 140°C to 150°C for about 16 to 48 hours. Where each of $Z^{1\prime\prime\prime}$ and $Z^{2\prime\prime\prime}$ represents the group $OR^5$ in which $R^5$ is aryl or substituted aryl, the aryl or substituted aryl groups are removed by alkaline hydrolysis in a step-wise manner by reacting first at room temperature in an aqueous organic solution of a strong alkali metal hydroxide such as lithium hydroxide or sodium hydroxide in aqueous dioxane, tetrahydrofuran, acetonitrile, and the like, for about 30 minutes to 2 hours. The second $OR^5$ group is removed by refluxing with saturated aqueous barium hydroxide solution for 30 minutes to two hours. Alternatively, the second $OR^5$ group is removed by enzymatic action by incubation in the presence of a snake venom phosphodiesterase such as that present in the venom of *Crotalus adamanteus* and the like. Where each of $Z^{1\prime\prime\prime}$ and $Z^{2\prime\prime\prime}$ represents the group $OR^5$ in which $R^5$ is a lower alkenyl or aryl group, more specifically an allyl group, a benzyl group or a substituted benzyl group, the allyl, benzyl or substituted benzyl groups are removed by hydrogenolysis at room temperature over a palladium on an inert support catalyst such as a palladium-on-barium sulfate catalyst under a slight positive pressure of hydrogen for a period of about 2 to 6 hours. Where each of $Z^{1\prime\prime\prime}$ and $Z^{2\prime\prime\prime}$ represents the group $OR^5$ in which $R^5$ is phenyl, substituted phenyl or naphthyl, the nucleoside 6'-phosphonic acid can be prepared by subjecting the nucleoside 6'-phosphonate to transesterification by treatment with a primary alcohol in dipolar organic solvent in the presence of a base followed by anionic dealkylation in the case of dialkyl phosphonates or hydrogenolysis in the case of diaralkyl phosphonates. Suitable primary alcohols include the saturated aliphatic alcohols such as methanol, ethanol, 2,2,2-trichloroethanol, and the like of up to about six carbon atoms and aralkyl alcohols such as benzyl alcohol, methylbenzyl alcohol, β-phenylethanol, 3-phenyl-1-propanol, 4-phenyl-1-butanol, and the like. Suitable bases for generating the alkoxide or aralkoxide include the alkali metal hydrides, alkali metals, alkali metal t-butoxides, triethylamine, and the like. The reaction is carried out under anhydrous conditions in a dipolar organic solvent such as dimethylformamide, dimethylsulfoxide, and the like.

Where each of $Z^{1\prime\prime\prime}$ and $Z^{2\prime\prime\prime}$ represents the group $SR^6$ in which each of $R^6$ is lower alkyl, aryl or substituted aryl, the alkylthio, arylthio or substituted arylthio groups are removed in a stepwise manner by treatment with a mild alkali such as alkali metal bicarbonate or an alkali metal carbonate in an aqueous organic solvent such as aqueous methanol, acetone, and the like, at room temperature for a period of about 30 minutes to 6 hours to remove the first group and then by treatment with an aqueous acetone solution containing a molar equivalent of iodine to remove the second group, as described by A. Z. Nussbaum et al., *J. Am. Chem. Soc.*, 87 2513–4 (1965). Where $Z^{1\prime\prime\prime}$ and $Z^{2\prime\prime\prime}$ together represent the group

in which $R^9$ is arylene such as o-phenylene, the o-arylene group is removed in a step-wise manner by treatment with water to form an intermediary o-hydroxyphenyl monoester and second by treatment with an aqueous solution of bromine, essentially hypobromus acid, to cleave the o-hydroxyphenyl group, as described by T. A. Khawaja and C. E. Reese, *J. Am. Chem. Soc.*, 88, 3446–7 (1966). Where each of $Z^{1\prime\prime\prime}$ and $Z^{2\prime\prime\prime}$ represents the group

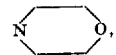

the morpholinyl groups are removed by aqueous hydrolysis with an acidic ion-exchange resin such as sulphonated polystyrene beads cross-linked with 8% divinylbenzene or with an aqueous inorganic acid such as hydrochloric acid. Where each of $Z^{1\prime\prime\prime}$ and $Z^{2\prime\prime\prime}$ represents the group

or $NR^{7\prime} R^{8\prime}$, the piperidyl groups or the dialkylamino groups are removed by aqueous hydrolysis with an acidic ion-exchange resin in the acid form or with an aqueous inorganic acid such as aqueous hydrochloric acid.

Alternatively, removal of the $Z^{1\prime\prime\prime}$ and $Z^{2\prime\prime\prime}$ groups can be effected by one of the procedures described hereinabove prior to the catalytic hydrogenation or diimide reduction procedure, as described hereinabove, to obtain the nucleoside 6'-phosphonic acids.

The novel phosphorylated phosphonium ylids of the present invention are versatile reagents useful in converting carbonyl compounds into phosphonates, free phosphonic acids or phosphonic acid salts. They are useful as intermediates in the preparation of, for example, insecticides, herbicides, oil additives, detergents, lubricant and oil additives, flame retardants, antioxidants and nucleoside phosphonates, phosphonic acids and phosphonic acid salts. Insecticides such as the alkyl p-nitrophenyl alkylphosphonates and thio analogs thereof can be prepared by condensing acetaldehyde, propanal, butanal, and the like, with the appropriately substituted phosphorylated phosphonium ylid, namely wherein Y is oxygen or sulfur; $Z^1$ is O-ethyl and $Z^2$ is O-p-nitrophenyl, followed by reducing the intermediary $\alpha$, $\beta$-unsaturated phosphonate or thiophosphonate by the diimide reduction. Herbicides such as the diesters of octylphosphonic acid can be prepared by condensing heptanal with the appropriately substituted phosphorylated phosphonium ylid, namely wherein Y is oxygen and each of $Z^1$ and $Z^2$ is the group $OR^3$ in which $R^3$ is lower alkyl, aryl or substituted aryl followed by catalytic hydrogenation or diimide reduction of the intermediary $\alpha,\beta$-unsaturated phosphonate. Oil additives such as the dialkyl styrylphosphonates can be prepared by condensing benzaldehyde with the appropriately substituted phosphorylated phosphonium ylid, namely wherein Y is oxygen and each of $Z^1$ and $Z^2$ is the group $OR^3$ in which $R^3$ is lower alkyl. The nucleoside 6'-phosphonic acids prepared according to the process of this invention and derivatives prepared therefrom are isosteric with the natural nucleoside 5'-phosphates and derivatives thereof and can be used in the same manner as and as a replacement for the latter compounds. The nucleoside 6'-phosphonic acids and derivatives thereof differ from the known nucleoside 5'-phosphates and derivatives thereof in that the former contains a P—$CH_2$—C group in place of the natural P—O—C group, thereby conferring greater metabolic stability to the former. The nucleoside 6'-phosphonic acids and derivatives thereof are not sensitive to cell wall phosphatase and hence are not cleaved into the parent materials during entrance into the cell. The nucleoside 6'-phosphonic acids and derivatives thereof are also useful intermediates for the preparation of cyclic 3',6'-phosphonates. This conversion can be accomplished by treating the nucleoside 6'-phosphonic acid with a dehydrating agent, e.g. a carbodiimide such as N,N'-dicyclohexylcarbodimide, N,N'-di-p-tolylcarbodiimide, and the like in a basic solvent such as pyridine according to the procedure of Smith et al., J. Am. Chem. Soc., 83, 698, (1961); U.S. Pat. No. 3,300,479; French 2883M (1964); or French 3249M (1965). The cyclic 3',6'-phosphonates can be used in the same manner as and as a replacement for nucleoside cyclic 3',5'-phosphonates such as adenosine 3',5'-cyclic phosphate which are useful, for example, for the control of steroid production, the treatment of hypotension and as vasodilators. The cyclic 3',6'-phosphonates being much less susceptible to hydrolysis than are the cyclic 3',5'-phosphates have the advantage of a longer biological half life.

The following examples are set forth to illustrate the present invention.

EXAMPLE 1

To a mixture of 7.14 g. (20 mmoles) of methyltriphenylphosphonium bromide in 100 ml. of ether, cooled to 20°C and under a nitrogen atmosphere, is added 12.6 ml. of a 1.6M solution of n-butyl lithium in hexane (20 mmoles). The mixture is allowed to stand at 20°C for additional ½ hour, at which time a yellow solution of methylenetriphenylphosphorane is present. To this mixture is then added dropwise a solution of 2.68 g. (10 mmoles) of diphenyl phosphorochloridate in 50 ml. of ether over a period of 5 minutes, and the resulting reaction mixture is allowed to stand for a period of 15 minutes. The reaction mixture is then extracted with two 100 ml. portions of 3N hydrochloric acid. The combined acid extracts are washed with ether, and then carefully neutralized by the dropwise addition of 4N aqueous sodium hydroxide to afford a precipitate. The precipitate is collected by filtration, washed with water and then hexane to yield diphenyl triphenylphosphoranylidenemethylphosphonate which is further purified by recrystallization from ethyl acetate:hexane.

In a similar manner by repeating the above procedure with one exception, namely substituting first methyldiphenyl-t-butylphosphonium bromide, second tetramethylphosphonium bromide, third methyltricyclohexylphosphonium bromide, and fourth dimethyldiphenylphosphonium bromide for methyltriphenylphosphonium bromide, there are generated in situ the corresponding intermediary monosubstituted phosphonium ylids first methylened phenyl-t-butylphosphorane, second methylenetrimethylphosphorane, third methylenetricyclohexylphosphorane, and fourth methylenemethyldiphenylphosphorane for methylenetriphenylphosphorane in the above procedure, and there are obtained the corresponding diphenyl phosphoranylidenemethylphosphonates, namely first diphenyl diphenyl-t-butylphosphoranylidenemethylphosphonate, second diphenyl trimethylphosphoranylidenemethylphosphonate, third diphenyl tricyclohexylphosphoranylidenemethylphosphonate, and fourth diphenyl methyldiphenylphosphoranylidenemethylphosphonate.

EXAMPLE 2

To a mixture of 1.78 g. of methyltriphenylphosphonium bromide in 25 ml. of ether, cooled to 20°C and under a nitrogen atmosphere, is added 3.10 ml. of 1.6M solution of n-butyl lithium in hexane. The mixture is allowed to stand at 20°C for an additional ½ hour, at which time a yellow solution of methylenetriphenylphosphorane is present. To this mixture is then added dropwise a solution of 0.74 g. of di-o-tolyl phosphorochloridate in 10 ml. of ether, and the resulting reaction mixture is allowed to stand at room temperature for a period of 15 minutes. The reaction mixture is then partitioned between 50 ml. of water and 50 ml. of benzene. The aqueous layer is separated and extracted with several portions of benzene. Then the combined organic phase and extracts are washed with water and dried over magnesium sulfate. After removing the magnesium sulfate by filtration, the organic phase is evaporated to dryness under reduced pressure to afford a colorless oil. The oil is recrystallized from ethyl acetate:-hexane to afford di-o-tolyl triphenylphosphoranylidenemethylphosphonate as a white crystalline solid.

In a similar manner by repeating the above procedure with one exception, namely substituting first di-m-tolyl phosphorochloridate, second di-p-tolyl phosphorochloridate, and third di-3,5-xylyl phosphorochloridate for the di-o-tolyl phosphorochloridate in the above procedure, there are obtained the corresponding diaryl triphenylphosphoranylidenemethylphosphonates, namely di-m-tolyl triphenylphosphoranylidenemethylphosphonate, di-p-tolyl triphenylphosphoranylidenemethylphosphonate and di-3,5-xylyl triphenyl phosphoranylidenemethylphosphonate, respectively.

EXAMPLE 3

To 100 ml. of anhydrous liquid ammonia, previously cooled in a Dry Ice-acetone bath and under an inert atmosphere of argon, are added 0.5 g. of metallic sodium and a few grains of ferric nitrate, and the resulting mixture is allowed to stir until it turns grey. Then 3.57 g. (10 mmoles) of methyltriphenylphosphonium bromide is added to the mixture. After stirring the mixture for 15 minutes, the ammonia is removed by evaporation leaving behind a residue. To this residue is then added 100 ml. of anhydrous tetrahydrofuran, and the resulting mixture is held at reflux for 20 minutes to expell any residual ammonia, then cooled and filtered through a sintered glass filter of medium porosity. To the filtrate is then added 1.34 g. (5 mmoles) of diphenyl phosphorochloridate and this mixture is then held at room temperature for a period of 30 minutes. The reaction mixture is then filtered and the filtrate evaporated to dryness to yield diphenyl triphenylphosphoranylidenemethylphosphonate which is further purified by recrystallization from ethyl acetate:hexane.

In a similar manner by repeating the above procedure with the phosphonium salts and phosphorylating agents indicated in the table, there are obtained the following products:

| Phosphonium Salts | Phosphorylating Agents | Products |
|---|---|---|
| ethyltriphenylphosphonium bromide | diphenylphosphorochloridate | diphenyl [1-triphenylphosphoranylidene]ethylphosphonate |
| methyltriphenylphosphonium bromide | diethyl phosphorochloridate | diethyl triphenylphosphoranylidenemethylphosphonate |
| dimethyldiphenylphosphonium bromide | diethyl phosphorochloridate | diethyl methyldiphenylphosphoranylidenemethylphosphonate |
| methyltriphenylphosphonium bromide | tetra-(p-nitrophenyl) pyrophosphate | di-(p-nitrophenyl) triphenylphosphoranylidenemethylphosphonate |
| methyltriphenylphosphonium bromide | dibenzyl phosphorochloridate | dibenzyl triphenylphosphoranylidenemethylphosphonate |
| methyltriphenylphosphonium bromide | di-(p-bromobenzyl) phosphorochloridate | di-(p-bromobenzyl) triphenylphosphoranylidenemethylphosphonate |
| methyltriphenylphosphonium bromide | diphenyl phosphorochloridothioate | diphenyl triphenylphosphoranylidenemethylthiophosphonate |
| methyltriphenylphosphonium bromide | di-(p-nitrobenzyl) phosphorochloridate | di-(p-nitrobenzyl) triphenylphosphoranylidenemethylphosphonate |
| methyltriphenylphosphonium bromide | o-phenylene phosphorobromidate | o-phenylene triphenylphosphoranylidenemethylphosphonate |
| methyltriphenylphosphonium bromide | 2,2-dimethyltrimethylene phosphorochloridate | 2,2-dimethyltrimethylene triphenylphosphoranylidenemethylphosphonate |

EXAMPLE 4

To 100 ml. of anhydrous liquid ammonia, previously cooled in a Dry Ice-acetone bath and under an inert atmosphere of argon, are added 0.5 g. of metallic sodium and a few grains of ferric nitrate, and the resulting mixture is allowed to stir until it turns grey. Then 3.57 g. (10 mmoles) of methyltriphenylphosphonium bromide is added to the mixture. After stirring the mixture for 15 minutes, the ammonia is removed by evaporation leaving behind a residue. To this residue is then added 100 ml. of anhydrous tetrahydrofuran, and the resulting mixture is held at reflux for 20 minutes to expell any residual ammonia, then cooled and filtered through a sintered glass filter of medium porosity. To the filtrate is then added 1.27 g. (5 mmoles) of phosphorodimorpholidic chloride and this mixture is then held at 40°C for a period of 1 hour. The reaction mixture is then filtered and the filtrate evaporated to dryness to yield triphenylphosphoranylidenemethylphosphonodimorpholidate which is further purified by recrystallization from ethyl acetate: hexane.

In a similar manner by repeating the above procedure with the phosphonium salts and phosphorylating agents indicated in the table, there are obtained the following products:

| Phosphonium Salts | Phosphorylating Agents | Products |
|---|---|---|
| methyltriphenylphosphonium bromide | phosphorodimorpholidic bromide | triphenylphosphoranylidenemethylphosphonodimorpholidate |
| methyltriphenylphosphonium bromide | diethyl phosphorochloridothioate | diethyl triphenylphosphoranylidenemethylthiophosphonate |
| methyltriphenylphosphonium bromide | N,N'-dimethylphosphorodianalidic chloride | triphenylphosphoranylidenemethylphosphonodi(N-methylanilidate) |
| methyltriphenylphosphonium bromide | O,O-diphenyl phosphorochloridothioate | diphenyl triphenylphosphoranylidenemethylthiophosphonate |
| tetramethylphosphonium bromide | O,O-diphenyl phosphorochloridothioate | diphenyl trimethyl phosphoranylidenemethylthiophosphonate |
| methyltri-n-butylphosphonium bromide | phosphorodimorpholidic bromide | tri-n-butylphosphoranylidenemethylphosphonodimorpholidate |

EXAMPLE 5

To 100 ml. of anhydrous liquid ammonia, previously cooled in a Dry Ice-acetone bath and under an inert atmosphere of argon, are added 0.5 g. of metallic sodium and a few grains of ferric nitrate, and the resulting mixture is allowed to stir until it turns grey. Then 4.34 g. (10 mmoles) of benzyltriphenylphosphonium bromide is added to the mixture. After stirring the mixture for 15 minutes, the ammonia is removed by evaporation leaving behind a residue. To this residue is then added 100 ml. of anhydrous tetrahydrofuran, and the resulting mixture is held at reflux for 20 minutes to expell any residual ammonia, then cooled and filtered through a sintered glass filter of medium porosity. To the filtrate is then added 1.34 g. (5 mmoles) of diphenyl phosphorochloridate and this mixture is then held at 65°C for a period of 2 hours. The reaction mixture is then filtered and the filtrate evaporated to dryness to yield diphenyl triphenylphosphoranylidenebenzylphosphonate which is further purified by recrystallization from ethyl acetate:hexane.

In a similar manner by repeating the above procedure with the phosphonium salts and phosphorylating agents indicated in the table, there are obtained the following products:

EXAMPLE 7

To a solution of 2.84 g. (10 mmoles) of 2',3'-O-isopropylideneuridine in 25 ml. of anhydrous dimethyl sulfoxide are added 6.2 g.(30 mmoles) of dicyclohexylcarbodiimide, 0.8 ml. (10 mmoles) of pyridine and 0.4 ml. (5 mmoles) of trifluoroacetic acid. The resulting solution is allowed to stand at 25°C for 6 hours, during which time dicyclohexylurea precipitates from the solution. At the end of the reaction, dicyclohexylurea is removed by filtration and washed with several portions of fresh, anhydrous dimethyl sulfoxide. To the combined filtrate and washings, is added 5.08 g. (10 mmoles) of diphenyl triphenylphosphoranylidenemethylphosphonate, and the resulting mixture is allowed to stand at 37°C for 16 hours. At this point, 200 ml. of ethyl acetate is added, and the organic phase is washed with three 100 ml. portions of water, dried, filtered, and evaporated under reduced pressure to afford a pale yellow oil. A solution of the thus-obtained oil in chloroform is chromatographed on eight 1 meter × 20 cm. glass plates coated with a 1.3 mm. layer of silicic acid. After development of the plates with ethyl acetate, two ultraviolet absorbing products are eluted from the plates with ethyl acetate. After removing the solvent from the faster moving product, there is obtained diphenyl [1-(5,6-dideoxy-2,3-O-isopropylidene-β-D-ribo-hex-5-enofuranosyl)uracil] 6'-phosphonate which is purified by recrystallization from aqueous ethanol. After removing the solvent from the slower moving product, there is obtained triphenylphosphine oxide.

| Phosphonium Salts | Phosphorylating Agents | Products |
|---|---|---|
| benzyltriphenyl-phosphonium bromide | diethyl phosphorochloridate | diethyl triphenyl-phosphoranylidene-benzylphosphonate |
| benzyldimethylphenyl-phosphonium bromide | diphenyl phosphorochloridate | diphenyl dimethyl-phenylphosphoranyl-idenebenzylphosphonate |
| p-nitrobenzyltri-phenylphosphonium bromide | diphenyl phosphorochloridothioate | diphenyl triphenyl-phosphoranylidene-p-nitrobenzylthio-phosphonate |
| benzyltricyclohexyl-phosphonium bromide | di-p-tolyl phosphorochloridate | di-p-tolyl tri-cyclohexylphos-phoranylidenebenzyl-phosphonate |

EXAMPLE 6

A mixture of 0.36 g. (1 mmole) of 2',3'-O-anisylideneuridine-5'-aldehyde [prepared in accordance with U.S. Pat. No. 3,248,380] and 0.508 g. (1 mmole) of diphenyl triphenylphosphoranylidenemethylphosphonate in 10 ml. of tetrahydrofuran is allowed to stand at 37°C for a period of 16 hours. The reaction mixture is then chromatographed on a 1 meter × 20 cm. glass plate coated with a 1.3 mm. layer of silicic acid. After development of the plate in the solvent mixture, isopropanol:chloroform (1:9), the main ultraviolet absorbing band (Rf= 0.5) is eluted with acetone. After removing the solvent by evaporation under reduced pressure, there is obtained diphenyl [1-(2,3-O-anisylidene5,6-dideoxy-β-D-ribo-hex-5-enofuranosyl)uracil] 6'-phosphonate as a white, homogeneous foam.

In a similar manner by repeating the above procedure with two exceptions, namely substituting a molar amount of each of 2',3'-O-isopropylideneadenosine and diethyl triphenylphosphoranylidenemethylphosphonate for 2',3'-O-isopropylideneuridine and diphenyl triphenylphosphoranylidenemethylphosphonate, respectively, there is obtained the corresponding product, namely diethyl [9-(5,6-dideoxy-2,3-O-isopropylideneβ-D-ribo-hex-5-enofuranosyl)adenine] 6'-phosphonate.

EXAMPLE 8

A solution of 512 mg. (1 mmole) of diphenyl [1-(5,6-dideoxy-2,3-O-isopropylidene-β-D-ribo-hex-5-enofuranosyl)-uracil] 6'-phosphonate in 30 ml. of methanol is hydrogenated at 20°C in the presence of 0.2 g. of a pre-reduced 5% palladiumon-barium sulfate catalyst and under a slight positive pressure of hydrogen for two hours, at which time, the uptake of hydrogen reached the theoretical value. The catalyst is removed by filtration through diatomaceous earth and washed with methanol. The combined filtrate and washings are evaporated to dryness under reduced pressure to yield diphenyl [1-(5,6-dideoxy-2,3-O-isopropylidene-β-D-ribo-hexofuranosyl)uracil] 6'-phosphonate as a white foam.

In a similar manner by repeating the above procedure with one exception, namely substituting a molar amount of diethyl [9-(5,6-dideoxy-2,3-O-isopropylidene-β-ribo-hex-5-enofuranosyl)-adenine] 6'-phosphonate for diphenyl [1-(5,6-dideoxy-2,3-O-isopropylidene-β-D-ribo-hex-5-enofuranosy)uracil] 6'-phosphonate, there is obtained the corresponding product, namely diethyl [9-(5,6-dideoxy-2,3-O-isopropylidene-β-D-ribo-hexofuranosyl)adenine] 6'-phosphonate.

EXAMPLE 9

A solution of 0.50 g. of diphenyl [1-(5,6-dideoxy-2,3-O-isopropylidene-β-D-ribo-hexofuranosyl)uracil] 6'-phosphonate in 20 ml. of 80% acetic acid is heated at 100°C for 2 hours. The solvent is then removed by evaporation under reduced pressure to yield a residue of diphenyl [1-(5,6-dideoxy-β-D-ribo-hexofuranosyl)uracil] 6'-phosphonate which is purified by repeated dissolution and evaporation from several quantities of ethanol.

In a similar manner by repeating the above procedure with one exception, namely substituting diethyl [9-(5,6-dideoxy 2,3-O-isopropylidene-β-D-ribo-hexofuranosyl)adenine] 6'-phosphonate for diphenyl [1-(5,6-dideoxy-2,3-O-isopropylidene-β-D-ribo-hexofuranosyl)uracil] 6'-phosphonate, there is obtained the corresponding product, namely diethyl [9-(5,6-dideoxy-β-D-ribo-hexofuranosyl)adenine] 6'-phosphonate.

EXAMPLE 10

To a solution of 119 mg. (0.25 mmole) of diphenyl [1-(5,6-dideoxy-β-D-ribo-hexofuranosyl)uracil] 6'-phosphonate in 10 ml. of dioxane and 10 ml. of water is added 1 ml. of 1N aqueous solution of lithium hydroxide. The resulting solution is allowed to stand at 20°C for 1 hour at which time the pH of the solution is adjusted to 7 by the addition of an acid-ion exchange resin. After removing the resin by filtration, the filtrate is reduced to dryness under reduced pressure to afford a residue. A solution of the thus-obtained residue in 10 ml. of water is chromatographed on a 1 meter x 20 cm. glass plate coated with a 1.3 mm. layer of microcystalline cellulose. After developing the plates in the solvent mixture, isopropanol:ammonium hydroxide:water (7:1:2), the ultraviolet absorbing material, having an RF value of 0.5 to 0.6, is eluted with water. After removal of the water by evaporation under reduced pressure, there is obtained phenyl [1(5,6-dideoxy-β-D-ribo-hexofuranosyl)-uracil] 6'-phosphonic acid as a chromatograpically homogeneous foam.

EXAMPLE 11

One milliliter of a solution containing 40 mg. (0.1 mmole) of phenyl [1-(5,6-dideoxy-β-D-ribo-hexofuranosyl)uracil] 6'-phosphonic acid, 60μl. of 0.01M aqueous magnesium chloride, 40μl. of a solution containing 10 mg/ml. of crude *Crotaleus adamanteus* venom in 0.5M tris(hydroxymethyl)aminomethane buffer at pH 8, 40μl. of a 1M tris(hdyroxymethyl)aminoethane buffer at pH 8, is incubated at 37°C for 24 hours. After this reaction time, the incubation mixture is then diluted with 25 ml. of water and chromatographed on a 1.5 × 20 cm. column containing 25 g. of diethylaminoethyl cellulose in the bicarbonate form. The column is washed with 200 ml. of water and then eluted with a linear gradient (0.002 –0.2M) of aqueous triethylammonium bicarbonate at pH 7.5. The main ultraviolet absorbing peak is collected and evaporated to dryness under reduced pressure to yield the bistriethylammonium salt of [1-(5,6-dideoxy-β-D-ribo-hexofuranosyl)uracil] 6-'phosphonic acid.

EXAMPLE 12

By repeating the procedure of Example 7 with two exceptions, namely substituting 3'-O-acetylthymidine and dibenzyl triphenylphosphoranylidenemethylphosphonate for 2',3'-O-isopropylideneuridine and diphenyl triphenylphosphoranylidenemethylphosphonate, respectively, there is obtained dibenzyl [1-(3-O-acetyl-2,5,6-trideoxy-β-D-erythro-hex-5-enufuranosyl)thymine] 6'-phosphonate.

EXAMPLE 13

A solution of 0.54 g. of dibenzyl [1-(3-O-acetyl-2,5,6-trideoxy-β-D-erythro-hex-5-enofuranosyl)thymine] 6'-phosphonate in 25 ml. of methanol is reduced at 25°C in the presence of 200 mg. of a pre-reduced 5% palladium-on-barium sulfate catalyst and under a slight positive pressure of hydrogen for a period of three hours. The catalyst is removed by filtration through diatomaceous earth, and washed with methanol. The combined filtrate and washings are evaporated to dryness under reduced pressure to yield [1-(3-O-acetyl-2,5,6-trideoxy-β-D-erythrohexofuranosyl)thymine] 6'-phosphonic acid.

A solution of the 0.5 g. of the latter material in 5 ml. of concentrated ammonium hydroxide is held at 25°C for a period of 30 minutes. After removing the solvent by evaporation under reduced pressure, the residue is chromatographed on a 3.0 × 30 cm. column of diethylaminoethyl cellulose in the bicarbonate form. The column is washed with 250 ml. of water and then eluted with a linear gradient (0.002–0.2M) of aqueous triethylammonium bicarbonate at pH 7.5. The major ultraviolet absorbing peak is collected and evaporated to dryness under reduced pressure to yield the bistriethylammonium salt of [1-(2,5,6-trideoxy-β-D-erythrohexofuranosyl)thymine] 6'-phosphonic acid.

EXAMPLE 14

A mixture of 1.76 g. of diethyl [9-(5,6-dideoxy-2,3-O-isopropylidene-β-D-ribohexofuranosyl)adenine] 6'-phosphonate and 1.8 g. of sodium iodide in 10 ml. of dimethylformamide is heated at 150°C for 20 hours. After cooling the reaction mixture, there is added 50 ml. of acetone. The resulting precipitate is collected and washed with several portions of acetone. The precipitate is then dissolved in water and passed through a column containing the free acid-form of an ion-exchange resin. The thus-obtained acidic eluate is concentrated under reduced pressure to one-half the original volume and then heated at 100°C for 4 hours to give an aqueous solution of [9-(5,6-dideoxy-β-D-ribohexofuranosyl)adenine] 6'-phosphonic acid. For purification, if desired, the pH of the eluate is adjusted to 8.5 with aqueous sodium hydroxide solution and the resulting mixture is chromatographed on a 4.0 × 40 cm. column of diethylaminoethyl cellulose in the bicarbonate form using a linear gradient (0.002 to 0.2M) of triethylammonium bicarbonate as eluant to afford the bistriethylammonium salt of [9-(5,6-dideoxy-β-D-ribohexofuranosyl)adenine] 6'-phosphonic acid.

An aqueous solution of the latter compound is passed through a column of cation-exchange resin in the acid-form, and th pH of the eluate is adjusted to 8.5 by the dropwise addition of aqueous sodium hydroxide solution. The eluate is then concentrated to a volume of approximately 10 ml., and added to 50 ml. of acetone to yield the disodium salt of [9-(5,6-dideoxy-β-D-ribohexofuranosyl)adenine] 6'-phosphonic acid as a white powder.

EXAMPLE 15

To a mixture of 512 mg. (1 mmole) of diphenyl [1-(5,6-dideoxy-2,3-O-isopropylidene-β-D-ribo-hex-5-enofuranosyl)uracil] 6'-phosphonate, 500 mg. of potassium azodicarboxylate in 20 ml. of methanol, is added dropwise 300 mg. of glacial acetic acid, and the reaction mixture is held at room temperature for a period of 24 hours. After this reaction time, the mixture is evaporated to dryness under reduced pressure and the residue partitioned between 50 ml. of ethyl acetate and 50 ml. of water. The aqueous layer is separated and extracted with several portions of ethyl acetate. The combined ethyl acetate layer and extracts are dried over magnesium sulfate, evaporated to dryness under reduced pressure to yield diphenyl [1-(5,6-dideoxy-2,3-O-isopropylidene-β-D-ribo-hexofuranosyl)uracil] 6'-phosphonate.

In a similar manner, by repeating the procedures of Examples 9, 10 and 11, the latter material is converted to the bis triethylammonium salt of [1-(5,6-dideoxy-β-D-ribo-hexofuranosyl)uracil] 6'-phosphonic acid.

EXAMPLE 16

A mixture of 92.7 g. of triphenylphosphine and 100.1 g. diphenyl chloromethylphosphonate is heated at 175° for 3½ hours. The resultant solid mass is dissolved in about 1700 ml. water and about 500 ml. ether and the phases are separated. The ether layer is further extracted with about 250 ml. water. The combined aqueous phases are brought to pH 8 by the cautious addition of 10 N sodium hydroxide and the precipitate removed by filtration and dried to give diphenyl triphenylphosphoranylidenemethylphosphonate which is crystallized from ethyl acetate.

EXAMPLE 17

A solution of 508 mg. of diphenyl triphenylphosphoranylidenemethylphosphonate in 10 ml. of methanol is heated under reflux for 30 minutes. Removal of the methanol by evaporation under reduced pressure gives a residual syrup which is crystallized from a mixture of ethyl acetate and hexane to give dimethyl triphenylphosphoranylidenemethylphosphonate.

EXAMPLE 18

To a stirred mixture of 4.82 g. (9mmole) of diphenyl [9-(5,6-dideoxy-2,3-O-isopropylidene-β-D-ribo-hex-5-enofuranosyl)adenine] 6'-phosphonate and 9.0 g. of potassium azodicarboxylate (45 mmole) in 135 ml. of pyridine is added 54 g. of glacial acetic acid (90 mmole). The yellow suspension is stirred under anhydrous conditions in an argon atmosphere for 24 hours and then the pyridine is removed by evaporation under reduced pressure. The yellow residue is partitioned between water (250 ml.) and ethyl acetate (250 ml.) and the water phase is further extracted with ethyl acetate (2 × 250 ml.). The organic phase are combined, washed with water (500), dried over magnesium sulfate, filtered and evaporated to dryness to give a pale yellow foam. This is dissolved in about 20 ml. of hot benzene and on cooling deposits white crystals which are collected to give diphenyl [9-( 5,6-diodeoxy-2,3-o-isopropylidene-β-D-ribo-hexofuranosyl)adenine] 6'-phosphonate.

EXAMPLE 19

A solution of 5.14 g. (10 mmole) of diphenyl [1-(5,6-dideoxy-2,3-O-isopropylidene--D-ribo-hexofuranosyl)uracil] 6'-phosphonate in 50 ml. of dimethyl sulfoxide is added rapidly at room temperature to a solution of 2.0 g. (42 mmoles) of sodiuim hydride (50% dispersion in mineral oil) in 20 ml. each of benzyl alcohol and dimethyl sulfoxide. After 15 minutes, the slightly yellow solution is poured into 250 ml. of water containing 3 ml. of glacial acetic acid. The resulting suspension is extracted with ethyl acetate (3 × 200 ml.) and the combined extracts are washed with aqueous sodium bicarbonate and then water. The organic phase is then dried over magnesium sulfate, filtered and evaporated to dryness to give a pale yellow oil. A solution of this oil is chloroform (25 ml.) is then applied to the top of a silica gel column (35 × 4.5 cm.). Development of the column with 1250 ml. chloroform and 650 ml. of ethyl acetate followed by elution with 1000 ml. 10 % methanol in ethyl acetate gives dibenzyl [1-(5,6-dideoxy-2,3-O-isopropylidene-β-D-ribohexofuranosyl)uracil] 6'-phosphonate.

EXAMPLE 20

A solution of 4.52 g. of dibenzyl [1-(5,6-dideoxy-2,3-O-isopropylidene-β-D-ribo-hexofuranosyl)uracil] 6'-phosphonate in 100 ml. of methanol is added to a pre-reduced suspension of 2 g. of 5% palladium-on-barium sulfate in 100 ml. of methanol. The resultant mixture is stirred at room temperature under 1 atmosphere of hydrogen for 50 minutes at which time the theoretical volume of hydrogen has been consumed. The catalyst is removed by filtration through diatomaceous earth and the combined filtrate and washings are evaporated to dryness to yield a white foam which is redissolved in 50 ml. of water. The aqueous solution is passed down an acid ion-exchange columne (2.5 × 20 cm.) which is washed with water. The first 225 ml. of column eluant is heated at 100°C for 1 hour and then evaporated to dryness under reduced pressure. The residue is reevaporated several times from methanol solution and is then dissolved in 50 ml. of hot ethanol. The solution on cooling deposits a white microcrystalline solid to yield [1-(5,6-dideoxy-β-D-ribo-hexofuranosyl)uracil] 6'-phosphonic acid.

EXAMPLE 21

The process of Example 7 is repeated using an equivalent amount of 1-($N^4,O^{2',3'}$-tribenzoyl-β-D-arabinofuranosyl) cytosine as the starting material and there is obtained diphenyl [1-(5,6-dideoxy $N^4$, $O^{2',3'}$ -tribenzoyl-β-D-arabino-hex-5-enofuranosyl)cytosine] 6'-phosphonate. This conversion can be illustrated as follows wherein B represents benzoyl and φ is phenyl:

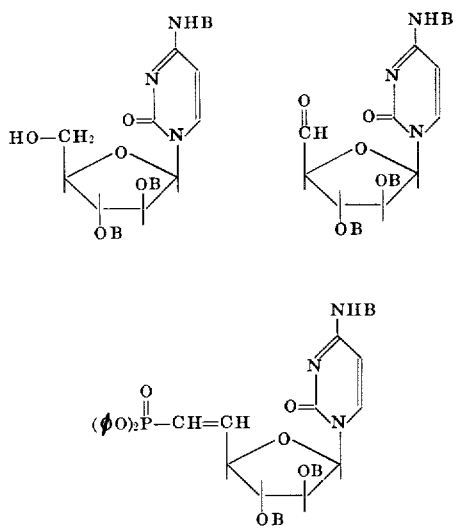

Similarly, by using 1-(2',3'-di-O-benzoyl-β-D-arabino-furanosyl)thymine and 1-(2',3'-di-o-benzoyl-β-D-arabinofuranosyl)uracil in the process of Example 7, there is obtained diphenyl [1-(5,6-dideoxy-2',3'-di-O-benzoyl-β-D-arabino-hex-5-enofuranosyl)thymine] 6'-phosphonate and diphenyl [1-(5,6-dideoxy-2',3'-di-O-benzoyl-β-D-arabino-hex-5-enofuranosyl)uracil] 6'-phosphonate, respectively.

By repeating the process of Example 18, the above compounds are reduced to the corresponding arabino-hexofuranosyl derivatives, that is, diphenyl [1-(5,6-dideoxy-N$^4$,O$^{2'}$ $^{3'}$-tribenzoyl-β-D-arabino-hexofuranosyl)cytosine] 6'-phosphonate, diphenyl [1-(5,6-dideoxy-2',3'-di-O-benzoyl-β-D-arabino-hexofuranosyl)thymine] 6'phosphonate and diphenyl [1-(5,6-dideoxy-2',3'-di-O-benzoyl-β-D-arabino-hexofuranosyl)uracil] 6'-phosphonate which are subjected to the processes of Examples 19 and 20 to give [1-(5,6-dideoxy-β-D-arabino-hexofuranosyl)cytosine] 6'-phosphonic acid, [1-(5,6-dideoxy-β-D-arabino-hexofuranosyl)thymine] 6'-phosphonic acid and [1-(5,6-dideoxy-β-D-arabino-hexofuranosyl)uracil] 6'-phosphonic acid.

EXAMPLE 22

The process of Example 19 is repeated using an equivalent amount of diphenyl [9-(5,6-dideoxy-2,2-O-isopropylidene-β-D-ribo-hexofuranosyl)adenine] 6'-phosphonate and diphenyl [1-(3-O-acetyl-2,5,6-trideoxy-β-D-erythro-hexofuranosyl)thymine] 6'-phosphonate as the starting material and there is obtained dibenzyl [9-(5,6-dideoxy-2,3-O-isopropylidene-β-D-ribo-hexofuranosyl)adenine] 6'-phosphonate and dibenzyl [1-(3-O-acetyl-2,5,6-trideoxy-β-D-erythro-hexofuranosyl)thymine] 6'-phosphonate, respectively, which are subjected to the process of Example 20 to yield [9-(5,6-dideoxy-β-D-ribo-hexofuranosyl)adenine] 6'-phosphonic acid and [1-(2,5,6-trideoxy-β-D-erythro-hexofuranosyl)thymine] 6'-phosphonic acid, respectively.

EXAMPLE 23

The process of Example 19 is repeated with the exception of using an equivalent amount of methanol in place of benzyl alcohol and there is obtained dimethyl [1-(5,6-dideoxy-2,3-O-isopropylidene-β-D-ribo-hexofuranosyl)uracil] 6'-phosphonate.

Similarly, by using ethanol there is obtained diethyl [1-(5,6-dideoxy-2,3-O-isopropylidene-β-D-ribo-hexofuranosyl)uracil] 6'-phosphonate.

By subjecting the above compounds to the dealkylation procedure of Example 14, there is obtained the disodium salt of [1-(5,6-dideoxy-β-D-ribo-hexofuranosyl)uracil] 6'-phosphonic acid.

What is claimed is:

1. A process for preparing 5',6'-dideoxy-hex-5'-enonucleosides 6'-phosphonates, which comprises reacting a nucleoside 5'-aldehyde selected from the group having the formulas:

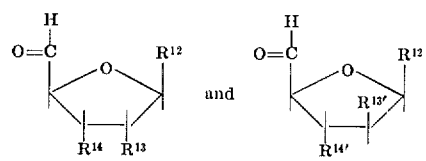

wherein

R$^{12}$ is selected from the group consisting of uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 4-chloro-6-aza-1,2-dihydropyrimidin-2-on-1-yl, 6-azathymin-1-yl, hypoxanthin-9-yl, adenin-9-yl, 6-dimethylaminopurin-9-yl, 2-chloroadenin-9-yl, 6-chloropurin-9-yl, 6-mercaptopurin-9-yl, guanin-9-yl, xanthin-9-yl, 2,6-dichloropurin-9-yl, 2,6-bis(methylamino)purin-9-yl, 8-azaadenin-9-yl, 8-azaguanin-9-yl, and 7-deazaadenin-9-yl; and R$^{13}$, R$^{13'}$ R$^{14}$, and R$^{14'}$ are independently selected from the group of hydrogen, hydroxy, methoxy, acetoxy, and benzoyloxy, or R$^{13}$ and R$^{14}$ together form acetal, isopropylidenedioxy or p-anisylidenedioxy with a phosphorylated ylid having the formula

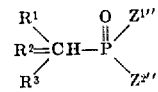

wherein

R$^1$, R$^2$ and R$^3$ are independently selected from the group of lower alkyl having from 1 to 6 carbon atoms, aryl having from 6 to 12 carbon atoms, or substituted aryl selected from the group of p- chlorobenzyl, p-bromobenzyl, 2,4,6-trichlorophenyl, p-nitrophenyl, p-nitrobenzyl, p-anisyl, p-methoxybenzyl, and p-dimethylaminophenyl or $R^1$, $R^2$ and $R^3$ together are tri-N-piperidyl, tri-N-morpholinyl, or tricyclohexyl; and $Z^{1''}$ and $Z^{2''}$ are independently selected from the group of $-OR^5$, $-SR^6$,

or $-NR^{7'}R^{8'}$ in which $R^5$ and $R^6$ are independently selected from the group of lower alkyl having from 1 to 6 carbon atoms, lower alkenyl having from 2 to 6 carbon atoms, aryl having from 6 to 12 carbon atoms or substituted aryl as defined herein above, and $R^{7'}$ and $R^{8'}$ are independently lower alkyl having from 1 to 6 carbon atoms or $Z^{1''}$ and $Z^{2''}$ together form the group

in which $R^{9'}$ is arylene having from 6 to 12 carbon atoms; in a substantially anhydrous non-reactive organic solvent under reactive conditions thereby forming the corresponding 5',6'-dideoxy-hex-5'-eno-nucleoside 6'-phosphonate.

2. A process for preparing 6'-phosphonic acid nucleosides which comprises reacting a 6'-phosphonite nucleoside selected from the group having the formulas

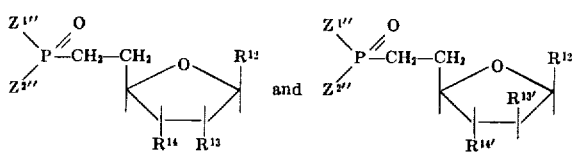

wherein $R^{12}$ is selected from the group consisting of uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminocytosin-1-yl, 5-methylaminocytosin-1-yl, 5-hydroxyuracil-1-yl, 6-azauracil-1-yl, 6-azacytosin-1-yl, 4-chloro-6-aza-1,2-dihydropyrimidin-2-on-1-yl, 6-azathymin-1-yl, hypoxanthin-9-yl, adenin-9-yl, 6-dimethylaminopurin-9-yl, 2-chloroadenin-9-yl, 6-chloropurin-9-yl, 6-mercaptopurin-9-yl, guanin-9-yl, xanthin-9-yl, 2,6-dichloropurin-9-yl, 2,6-bis(methylamino)purin-9-yl, 8-azaadenin-9-yl, 8-azaguanin-9-yl, and 7-deazaadenin-9-yl; and $R^{13}$, $R^{13'}$, $R^{14}$, $R^{14'}$ are independently selected from the group of hydrogen, hydroxy, methoxy, acetoxy, and benzoyloxy, or $R^{13}$ and $R^{14}$ together form acetal, isopropylidenedioxy or p-anisylidenedioxy; and $Z^{1''}$ and $Z^{2''}$ are each the group $-OR^5$ wherein $R^5$ is selected from the group of phenyl, toluoyl, 2,4,6-trichlorophenyl, p-nitrophenyl, p-dimethylaminophenyl and naphthyl with an aryl alkyl primary alcohol selected from the group of benzyl alcohol or methyl benzyl alcohol in the presence of a base selected from the group of alkaline metal hydrides, alkali metals, alkali metal t-butoxies, and triethylamine, in an aqueous dipolar organic solvent thereby yielding the corresponding diarylalkyl nucleoside 6'-phosphonate and hydrogenating said diarylalkyl nucleoside 6'-phosphonate in the presence of a hydrogenolysis catalyst under reactive conditions thereby yielding the corresponding nucleosides 6'-phosphonic acid.

3. The process according to claim 1 wherein each of $Z^{1''}$ and $Z^{2''}$ is the group $OR^5$ in which $R^5$ is phenyl;

4. The process according to claim 3 wherein each of $R^1$, $R^2$ and $R^3$ is phenyl.

5. The process according to claim 2 wherein said nucleoside 6'-phosphonate is a diphenyl nucleoside 6'-phosphonate, said alcohol is benzyl alcohol, said base is an alkali metal hydride and said catalytic hydrogenolysis is carried out with a palladium catalyst.

6. The process of claim 1 wherein said 5'-aldehyde nucleoside has the formula:

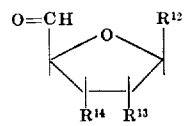

wherein $R^{12}$ is as defined in claim 1 and $R^{13}$ and $R^{14}$ are each acetoxy or together form the group isopropylidenedioxy or p-anisylidenedioxy.

7. The process of claim 1 wherein said 5'-aldehyde nucleoside has the formula:

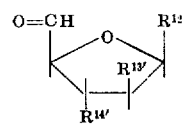

wherein $R^{12}$ is as defined in claim 1 and $R^{13'}$ and $R^{14'}$ are each benzoyloxy.

8. The process of claim 1 wherein said reaction is conducted at temperatures in the range of about from 25°C to the reflux temperature of said organic solvent.

* * * * *